(12) United States Patent
Wang

(10) Patent No.: US 11,956,134 B2
(45) Date of Patent: Apr. 9, 2024

(54) MULTI-LINK RECEIVING METHOD AND MULTI-LINK RECEIVER

(71) Applicant: Ufi Space co., Ltd., New Taipei (TW)

(72) Inventor: Yu-Min Wang, Taoyuan (TW)

(73) Assignee: Ufi Space co., Ltd., New Taipei (TW)

( * ) Notice: Subject to any disclaimer, the term of this patent is extended or adjusted under 35 U.S.C. 154(b) by 258 days.

(21) Appl. No.: 17/530,457

(22) Filed: Nov. 19, 2021

(65) Prior Publication Data

US 2023/0164048 A1    May 25, 2023

(51) Int. Cl.
*H04L 43/0852* (2022.01)
*H04L 43/16* (2022.01)
*H04L 49/9057* (2022.01)
*H04W 28/08* (2023.01)

(52) U.S. Cl.
CPC .......... *H04L 43/0858* (2013.01); *H04L 43/16* (2013.01)

(58) Field of Classification Search
CPC ............................ H04L 43/0858; H04L 43/16
See application file for complete search history.

(56) References Cited

FOREIGN PATENT DOCUMENTS

| CN | 110149272 A | * | 8/2019 | ............. H04L 45/22 |
| CN | 112825513 A | * | 5/2021 | ............ H04L 1/0083 |

* cited by examiner

*Primary Examiner* — Jeffrey M Rutkowski
*Assistant Examiner* — Christopher Nguyen
(74) *Attorney, Agent, or Firm* — JCIPRNET

(57) ABSTRACT

The disclosure provides a multi-link receiving method and a multi-link receiver. The method includes the following. A reference delay range of a j-th data section is determined according to a preset delay time and a receiving time point of the j-th data section of an i-th data frame. In response to determining that the j-th data section is first received among an N number of data sections of the i-th data frame, the reference delay range of the j-th data section is taken as a designated delay range. In response to determining that receiving time points of the data sections of the i-th data frame are each within the designated delay range, the i-th data frame is restored based on the N number of data sections of the i-th data frame.

10 Claims, 8 Drawing Sheets

MULTI-LINK RECEIVING METHOD AND MULTI-LINK RECEIVER

BACKGROUND

Technical Field

The disclosure relates to a multi-link communication mechanism. Particularly, the disclosure relates to a multi-link receiving method and a multi-link receiver.

Description of Related Art

A multi-link transmission mechanism achieves not only transmission of a relatively large bandwidth using a relatively low wire speed, but also link protection and load balance, and is thus widely used in communication systems.

With reference to FIG. 1A to FIG. 1C, FIG. 1A is a diagram of a conventional multi-link transmission mechanism, FIG. 1B is a schematic diagram of dividing data frames into data sections, and FIG. 1C is a schematic diagram of transmitting data sections by multi-link channels. In FIG. 1A to FIG. 1C, a multi-link channel 103 may be present between a multi-link transmitter 101 and a multi-link receiver 102. In an embodiment, assuming that the multi-link channel 103 includes a total of an N number of link channels (where N is a positive integer), then when the multi-link transmitter 101 is to send a certain data frame (labeled with FX) to the multi-link receiver 102, the multi-link transmitter 101 may divide the data frame into an N number of data sections link_1[X] to link_N[X], and then send the N number of data sections to the multi-link receiver 102 respectively through the N number of link channels.

For example, assuming that the multi-link transmitter 101 is to send a data frame F1 to the multi-link receiver 102, the multi-link transmitter 101 may first divide the data frame F1 into an N number of data sections link_1[1] to link_N[1], and then send the data sections link_1[1] to link_N[1] to the multi-link receiver 102 respectively through the N number of link channels. Similarly, when the multi-link transmitter 101 is to send a data frame F2, the multi-link transmitter 101 may also divide the data frame F2 into data sections link_1[2] to link_N[2], and then send the data sections link_1[2] to link_N[2] to the multi-link receiver 102 through the N number of link channels. In addition, when the multi-link transmitter 101 is to send a data frame FM, the multi-link transmitter 101 may also divide the data frame FM into data sections link_1[M] to link_N[M], and then send the data sections link_1[M] to link_N[M] to the multi-link receiver 102 through the N number of link channels.

With reference to FIG. 2, FIG. 2 is a schematic diagram of a multi-link receiving mechanism according to FIG. 1A to FIG. 1C. In FIG. 2, the multi-link receiver 102 may include a receiving interface 102a, a buffer 102b, a recombining circuit 102c, and a differential delay control management (DDCM) circuit 102d. Generally speaking, data sections link_1[X] to link_N[X] may arrive at the receiving interface 102a through different transmission paths. As a result, a difference (commonly known as a differential delay) may be present between times when the data sections link_1[X] to link_N[X] arrives at the receiving interface 102a. In this case, the buffer 102b may be configured to temporarily store the data sections link_1[X] to link_N[X], while the recombining circuit 102c and the DDCM circuit 102d may work together to combine the data sections link_1[X] to link_N[X] to restore a data frame FX.

According to the above, a DDCM mechanism may be important in a multi-link transmission system. However, since the DDCM mechanism may be complicated, a DDCM mechanism not performed properly may cause additional delay and packet loss.

SUMMARY

In view of this, the disclosure provides a multi-link receiving method and a multi-link receiver, which may be used to solve the above technical problems.

The disclosure provides a multi-link receiving method, adapted for a multi-link receiver. The multi-link receiving method includes the following. in response to determining that a j-th data section belonging to an i-th data frame is received, a reference delay range of the j-th data section of the i-th data frame is determined according to a preset delay time and a receiving time point of the j-th data section of the i-th data frame, where the i-th data frame includes an N number of data sections, $1 \leq j \leq N$, i is an index value, and N is a positive integer; in response to determining that the j-th data section of the i-th data frame is first received among the N number of data sections of the i-th data frame, the reference delay range of the j-th data section of the i-th data frame is taken as a designated delay range corresponding to the i-th data frame; and in response to determining that receiving time points of the data sections of the i-th data frame are each within the designated delay range corresponding to the i-th data frame, the i-th data frame is restored based on the N number of data sections of the i-th data frame.

The disclosure provides a multi-link receiver, including a receiving circuit and a processing circuit. The receiving circuit receives a j-th data section belonging to an i-th data frame. The processing circuit is coupled to the receiving circuit, and is configured to: determine a reference delay range of the j-th data section of the i-th data frame according to a preset delay time and a receiving time point of the j-th data section of the i-th data frame, where the i-th data frame includes an N number of data sections, $1 \leq j \leq N$, i is an index value, and N is a positive integer; in response to determining that the j-th data section of the i-th data frame is first received among the N number of data sections of the i-th data frame, take the reference delay range of the j-th data section of the i-th data frame as a designated delay range corresponding to the i-th data frame; and in response to determining that receiving time points of the data sections of the i-th data frame are each within the designated delay range corresponding to the i-th data frame, restore the i-th data frame based on the N number of data sections of the i-th data frame.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
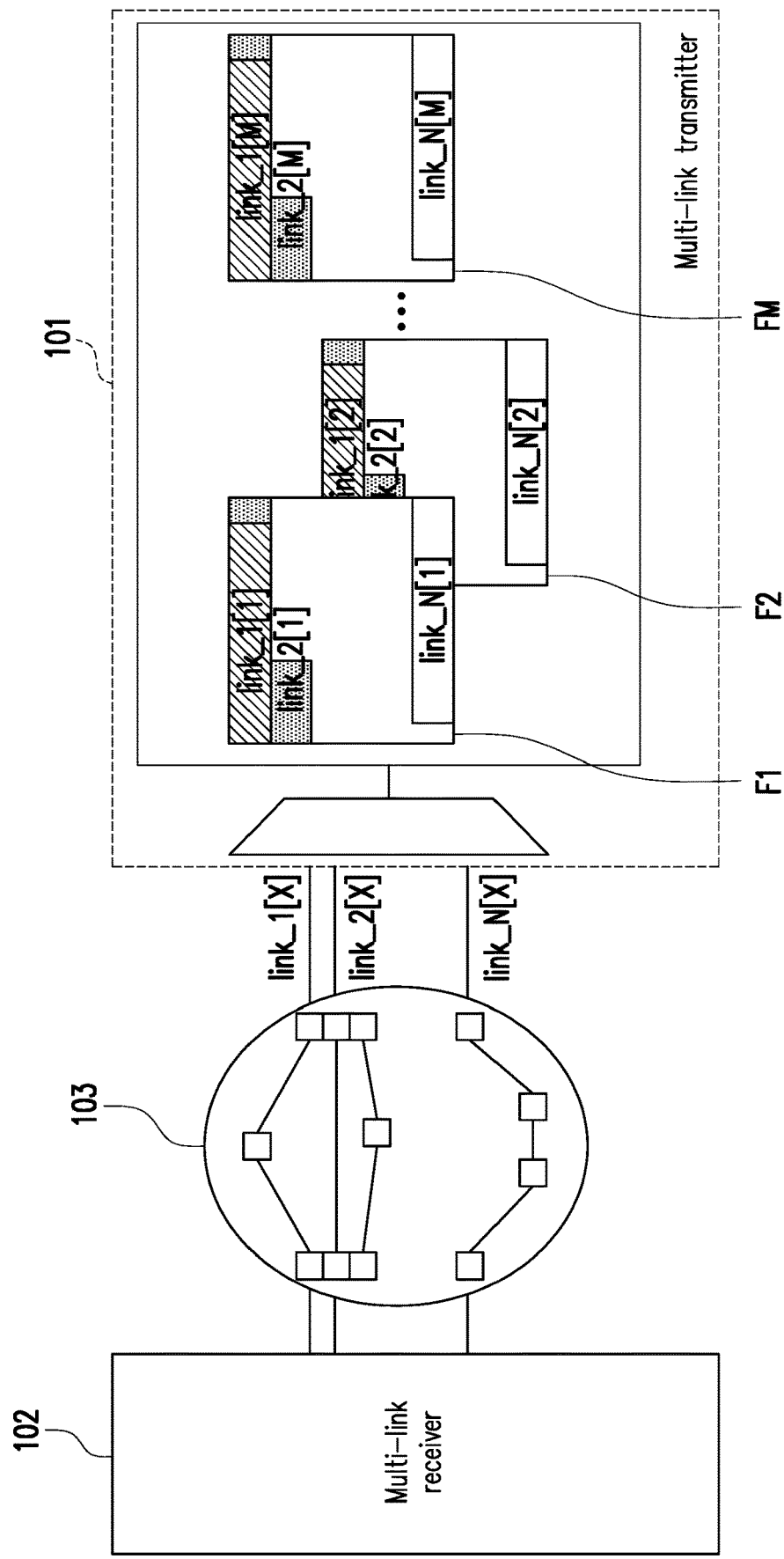
FIG. 1A is a diagram of a conventional multi-link transmission mechanism.
Figure 1B:
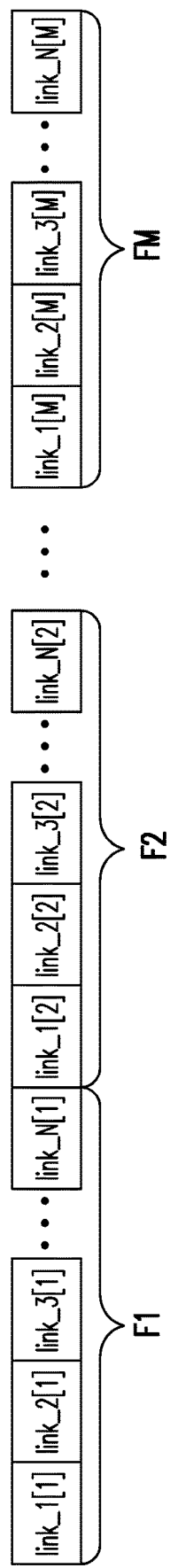
FIG. 1B is a schematic diagram of dividing data frames into data sections.
Figure 1C:
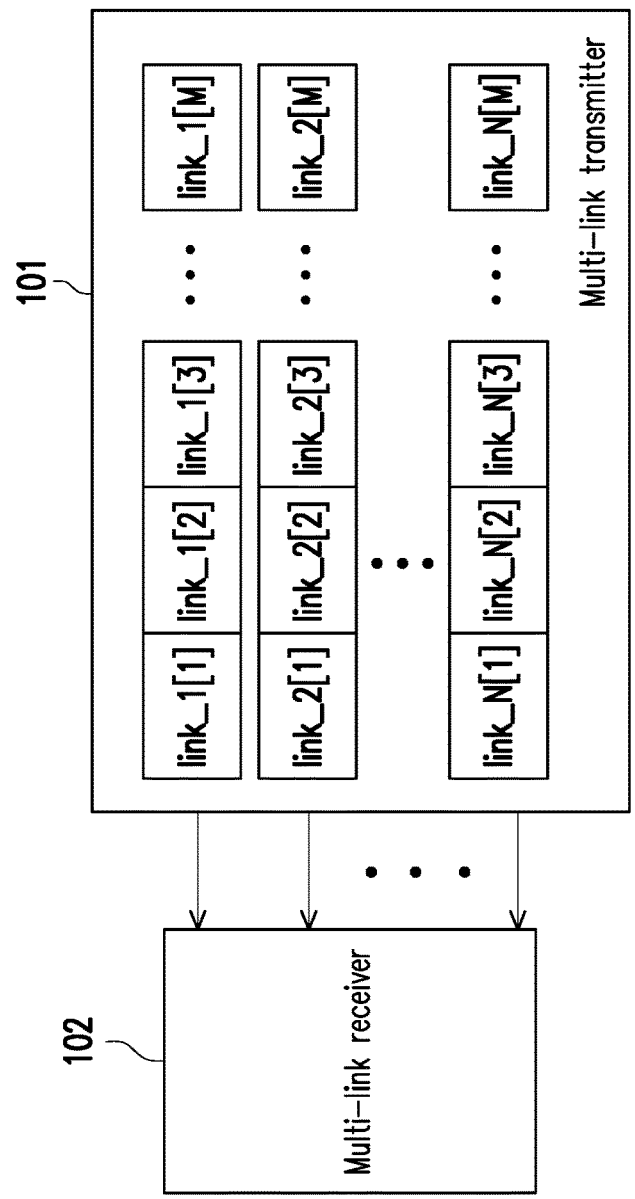
FIG. 1C is a schematic diagram of transmitting data sections by multi-link channels.
Figure 2:
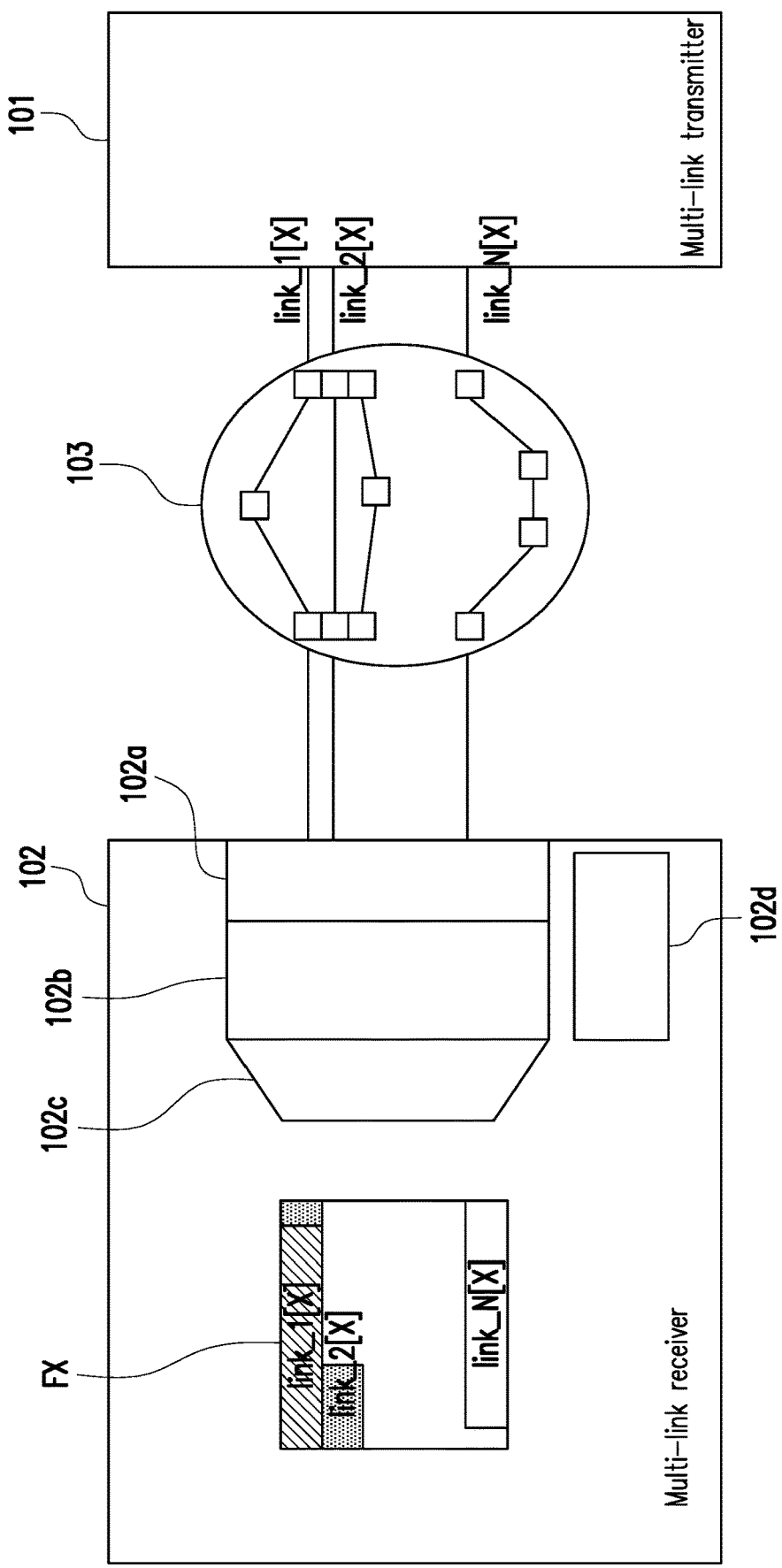
FIG. 2 is a schematic diagram of a multi-link receiving mechanism according to FIG. 1A to FIG. 1C.
Figure 3:
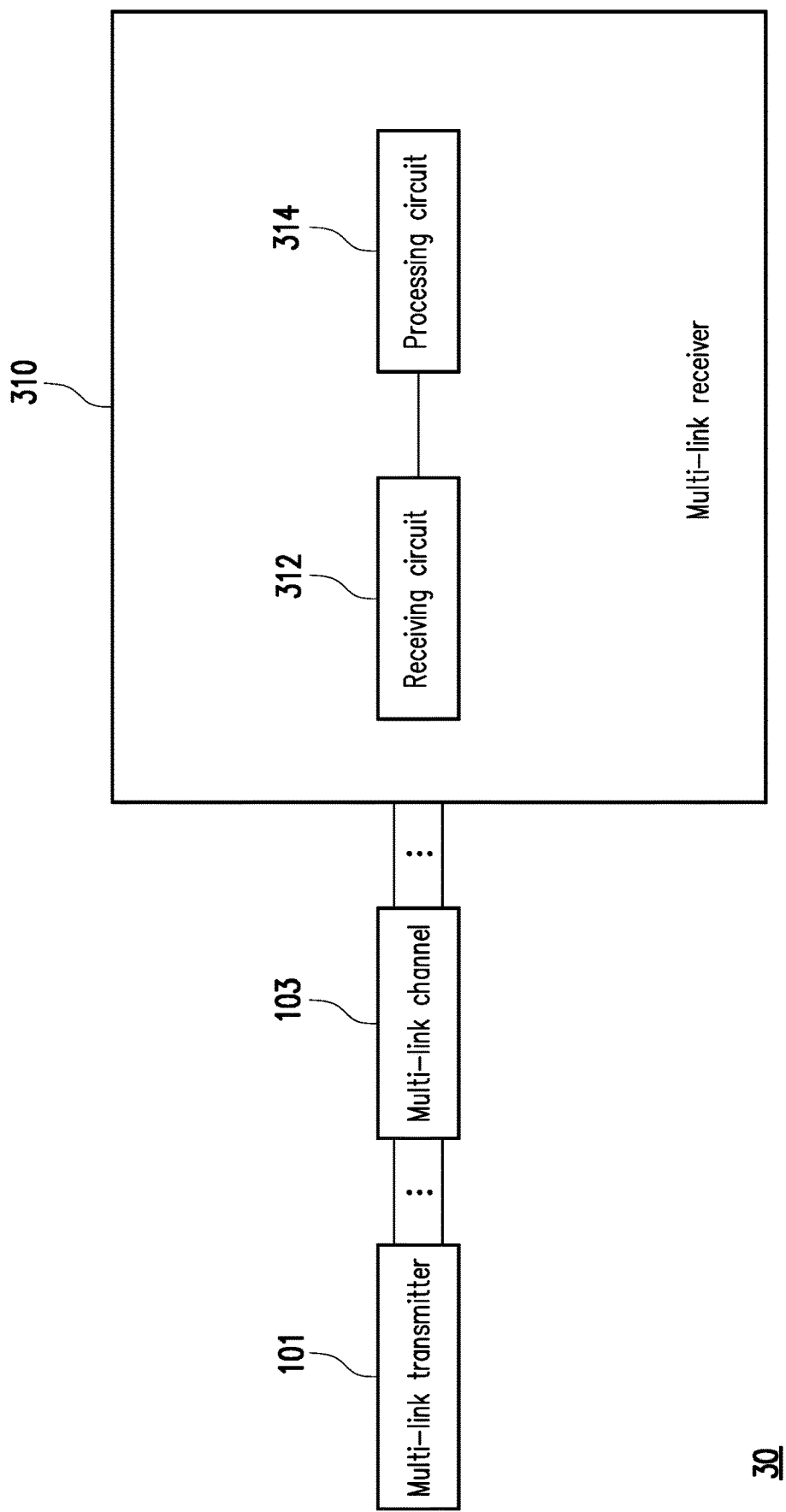
FIG. 3 is a schematic diagram of a multi-link transmission system according to an embodiment of the disclosure.

With reference to FIG. 3, FIG. 3 is a schematic diagram of a multi-link transmission system according to an embodiment of the disclosure. In FIG. 3, a multi-link transmission system 30 includes, for example, the multi-link transmitter 101 and a multi-link receiver 310. The multi-link transmitter 101 may send an N number of data sections divided from a data frame to the multi-link receiver 310 through the multi-link channel 103. Reference may be made to the above description for the details of the multi-link transmitter 101 and the multi-link channel 103 of this embodiment, which will not be repeatedly described herein.

In an embodiment, the multi-link receiver 310 includes a receiving circuit 312 and a processing circuit 314. The processing circuit 314 is coupled to the receiving circuit 312. In the embodiments of the disclosure, the receiving circuit 312 and the processing circuit 314 may work together to perform a multi-link receiving method provided by the disclosure, details of which are described below.

Figure 4:
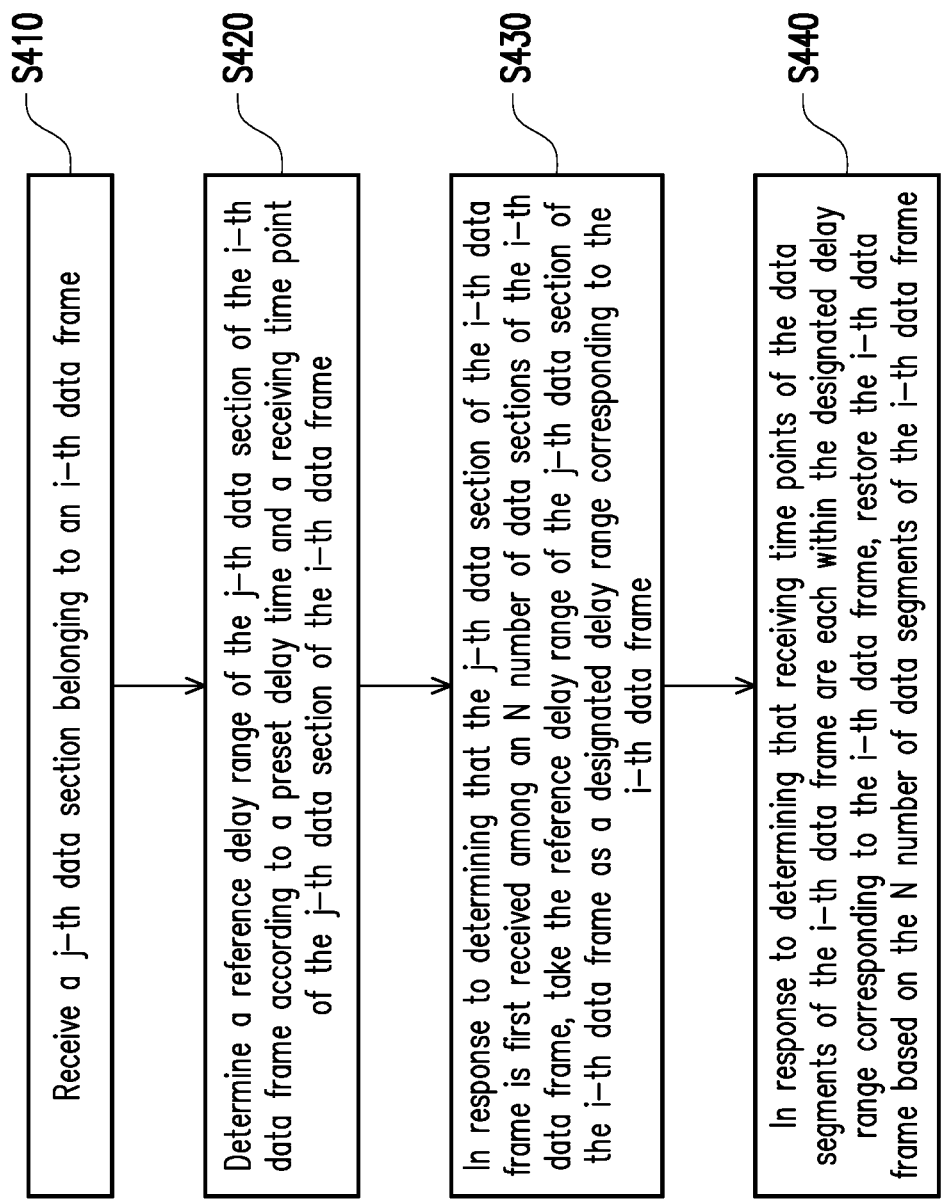
FIG. 4 is a flowchart of a multi-link receiving method according to an embodiment of the disclosure.
Figure 5:
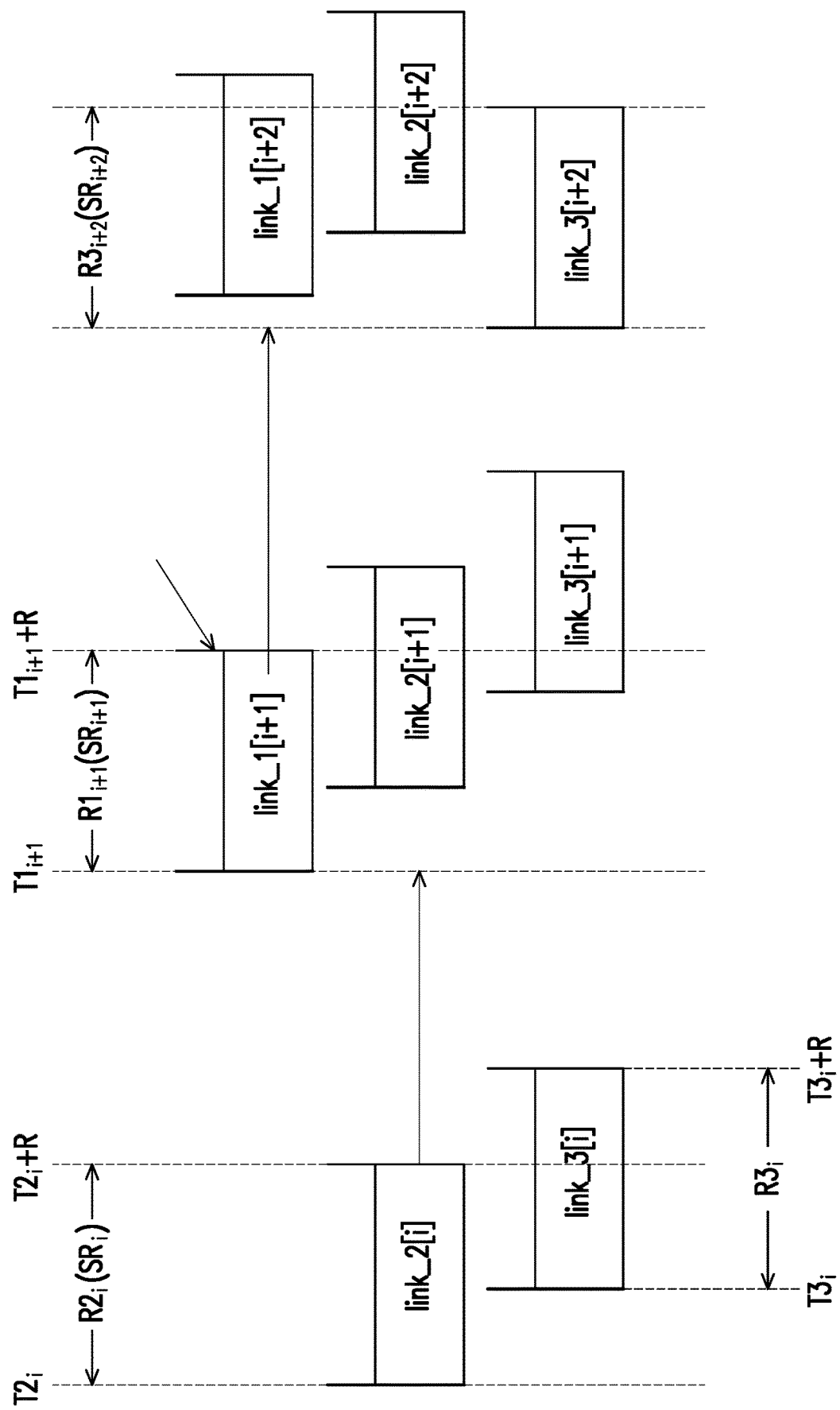
FIG. 5 is a diagram of an application scenario according to an embodiment of the disclosure.

With reference to FIG. 4, FIG. 4 is a flowchart of a multi-link receiving method according to an embodiment of the disclosure. The method of this embodiment may be performed by the multi-link receiver 310 of FIG. 3. Hereinafter, details of each step of FIG. 4 accompanied with the elements as shown in FIG. 3 will be described. In addition, to make the disclosure easier to understand, further description with the aid of FIG. 5 will be provided below. FIG. 5 is a diagram of an application scenario according to an embodiment of the disclosure.

First, in the scenario of FIG. 5, it is assumed that after the multi-link transmitter 101 divides an i-th data frame into an N number of data sections, the multi-link transmitter 101 sends the N number of data sections of the i-th data frame to the multi-link receiver 310 through the multi-link channel 103. For ease of description below, it may be assumed that N is 3, and a j-th data section of the i-th data frame is expressed as link_j[i]. Nonetheless, the disclosure is not limited thereto.

In step S410, the receiving circuit 312 receives the j-th data section belonging to the i-th data frame. After that, in step S420, the processing circuit 314 determines a reference delay range of the j-th data section of the i-th data frame according to a preset delay time and a receiving time point of the j-th data section of the i-th data frame.

For example, in the scenario of FIG. 5, after the receiving circuit 312 receives a data section link_2[i] (i.e., the second data section of the i-th data frame), the processing circuit 314 may determine a reference delay range $R2_i$ of the data section link_2[i] according to a preset delay time R and a receiving time point of the data section link_2[i].

In an embodiment, assuming that the preset delay time is R and the receiving time point of the data section link_2[i] is $T2_i$, then the processing circuit 314 may, for example, take $T2_i$ and $T2_i+R$ as the lower limit and the upper limit of the reference delay range $R2_i$ of the data section link_2[i]. In different embodiments, designers may select the appropriate value of R as required.

In addition, for other data sections of the i-th data frame, the processing circuit 314 may also determine corresponding reference delay ranges for these data sections individually. For example, after the receiving circuit 312 receives a data section link_3[i] (i.e., the third data section of the i-th data frame), the processing circuit 314 may determine a reference delay range $R3_i$ of the data section link_3[i] according to the preset delay time R and a receiving time point of the data section link_3[i]. Assuming that the receiving time point of the data section link_3[i] is $T3_i$, then the processing circuit 314 may, for example, take $T3_i$ and $T3_i+R$ as the lower limit and the upper limit of the reference delay range $R3_i$ of the data section link_3[i].

After that, in step S430, in response to determining that the j-th data section of the i-th data frame is first received among the N number of data sections of the i-th data frame, the processing circuit 314 takes the reference delay range of the j-th data section of the i-th data frame as a designated delay range $SR_i$ corresponding to the i-th data frame. In other words, the processing circuit 314 may find the data section first received by the multi-link receiver 310 among the N number of data sections of the i-th data frame, and then take the reference delay range corresponding to the data section as the designated delay range $SR_i$ corresponding to the i-th data frame.

In the scenario of FIG. 5, assuming that the data section link_2[i] is first received by the multi-link receiver 310 among the N number of data sections of the i-th data frame, then the processing circuit 314 may use the reference delay range $R2_i$ of the data section link_2[i] as the designated delay range $SR_i$ corresponding to the i-th data frame. In other words, when the data section link_2[i] precedes the other data sections (e.g., the data section link_3[i]) of the i-th data frame, the processing circuit 314 may define the reference delay range $R2_i$ of the data section link_2[i] as the designed delay range $SR_i$.

In other embodiments, if the data section link_3[i] precedes the other data sections (e.g., the data section link_2[i]) of the i-th data frame, the processing circuit 314 may define the reference delay range $R3_i$ of the data section link_3[i] as the designed delay range $SR_i$. Nonetheless, the disclosure is not limited thereto.

After that, the processing circuit 314 may determine whether receiving time points of the data sections of the i-th data frame are each within the designated delay range $SR_i$ corresponding to the i-th data frame.

In the scenario of FIG. 5, it is assumed that a first data section link_1[i] (not shown) of the i-th data frame is not received by the receiving circuit 312 for some reason. In other words, the processing circuit 314 fails to obtain a receiving time point of the data section link_1[i]. In this case, the processing circuit 314 may determine that the receiving time points of the data sections of the i-th data frame are not each within the designated delay range $SR_i$ corresponding to the i-th data frame. In this case, the processing circuit 314 may ignore the data sections of the i-th data frame, and may not restore the i-th data frame. In addition, the processing circuit 314 may also generate an alarm corresponding to the i-th data frame, so as to record that the i-th data frame is not successfully recombined and restored.

In addition, in response to determining that the receiving time points of the data sections of the i-th data frame are each within the designated delay range $SR_i$ corresponding to the i-th data frame, the processing circuit 314 may accordingly perform step S440.

In step S440, in response to determining that the receiving time points of the data sections of the i-th data frame are each within the designated delay range corresponding to the i-th data frame, the processing circuit 314 restores the i-th data frame based on the N number of data sections of the i-th data frame.

In an embodiment, assuming that the receiving time points of the data sections link_1[$i$] and link_3[$i$] are each within the designated delay range $SR_i$, the processor 314 may then recombine the data sections link_1[$i$] to link_3[$i$] to restore the i-th data frame.

For data sections of other data frames from the multi-link transmitter 101, the multi-link receiver 310 may also perform corresponding operations based on the above teachings.

For example, it is assumed that after the multi-link transmitter 101 divides an i+1-th data frame into an N number of data sections, the multi-link transmitter 101 sends the N number of data sections of the i+1-th data frame to the multi-link receiver 310 through the multi-link channel 103. For ease of description below, it may be assumed that a j-th data section of the i+1th data frame is expressed as link_j [i+1]. Nonetheless, the disclosure is not limited thereto.

In the scenario of FIG. 5, the processing circuit 314 may determine corresponding reference delay ranges for data sections link_1[$i$+1] to link_3[$i$+1] received by the receiving circuit 312. For example, after the receiving circuit 312 receives the data section link_1[$i$+1] (i.e., the first data section of the i+1-th data frame), the processing circuit 314 may determine a reference delay range $R1_{i+1}$ of the data section link_1[$i$+1] according to the preset delay time R and a receiving time point of the data section link_1[$i$+1]. Assuming that the receiving time point of the data section link_1[$i$+1] is $T1_{i+1}$, then the processing circuit 314 may, for example, take $T1_{i+1}$ and $T1_{i+1}+R$ as the lower limit and the upper limit of the reference delay range $R1_{i+1}$ of the data section link_1[$i$+1]. Based on a similar principle, the processing circuit 314 may accordingly determine reference delay ranges corresponding to the data sections link_2[$i$+1] and link_3[$i$+1].

In the scenario of FIG. 5, since the data section link_1 [$i$+1] is first received by the multi-link receiver 310 among the data sections link_1[$i$+1] to link_3[$i$+1], the processing circuit 314 may define the reference delay range $R1_{i+1}$ of the data section link_1[$i$+1] as a designated delay range $SR_{i+1}$ corresponding to the i+1-th data frame. After that, the processing circuit 314 may determine whether receiving time points of the data sections link_1[$i$+1] to link_3[$i$+1] are each within the designated delay range $SR_{i+1}$.

In FIG. 5, since the receiving time points of the data sections link_1[$i$+1] to link_3[$i$+1] are each within the designated delay range $SR_{i+1}$, the processing circuit 314 may accordingly recombine the data sections link_1[$i$+1] to link_3[$i$+1] to restore the i+1-th data frame.

In addition, for data sections link_1[$i$+2] to link_3[$i$+2] corresponding to an i+2-th data frame, the processing circuit 314 may define a reference delay range $R3_{i+2}$ of the data section link_3[$i$+2] as a designated delay range $SR_{i+2}$ corresponding to the i+2th data frame based on the above teachings. After that, the processing circuit 314 may determine whether receiving time points of the data sections link_1[$i$+2] to link_3[$i$+2] are each within the designated delay range $SR_{i+2}$. Since the receiving time points of the data sections link_1[$i$+2] to link_3[$i$+2] are each within the designated delay range $SR_{i+2}$, the processing circuit 314 may accordingly recombine the data sections link_1[$i$+2] to link_3[$i$+2] to restore the i+2-th data frame. Reference may be to the above embodiments for the relevant details, which will not be repeatedly described herein.

In an embodiment, the receiving circuit 312 may also receive an n-th data section belonging to an m-th data frame. The m-th data frame includes an N number of data sections, where 1≤n≤N, m is an index value, and m is greater than i. After that, the processing circuit 314 may determine whether a receiving time point of the n-th data section of the m-th data frame is within the designated delay range $SR_i$ corresponding to the i-th data frame.

In an embodiment, in response to determining that the receiving time point of the n-th data section of the m-th data frame is within the designated delay range $SR_i$ corresponding to the i-th data frame, the processing circuit 314 may ignore the data sections link_1[$i$] to link_3[$i$] of the i-th data frame. To make the aforementioned contents easier to understand, further description with the aid of FIG. 6 will be provided below.

Figure 6:
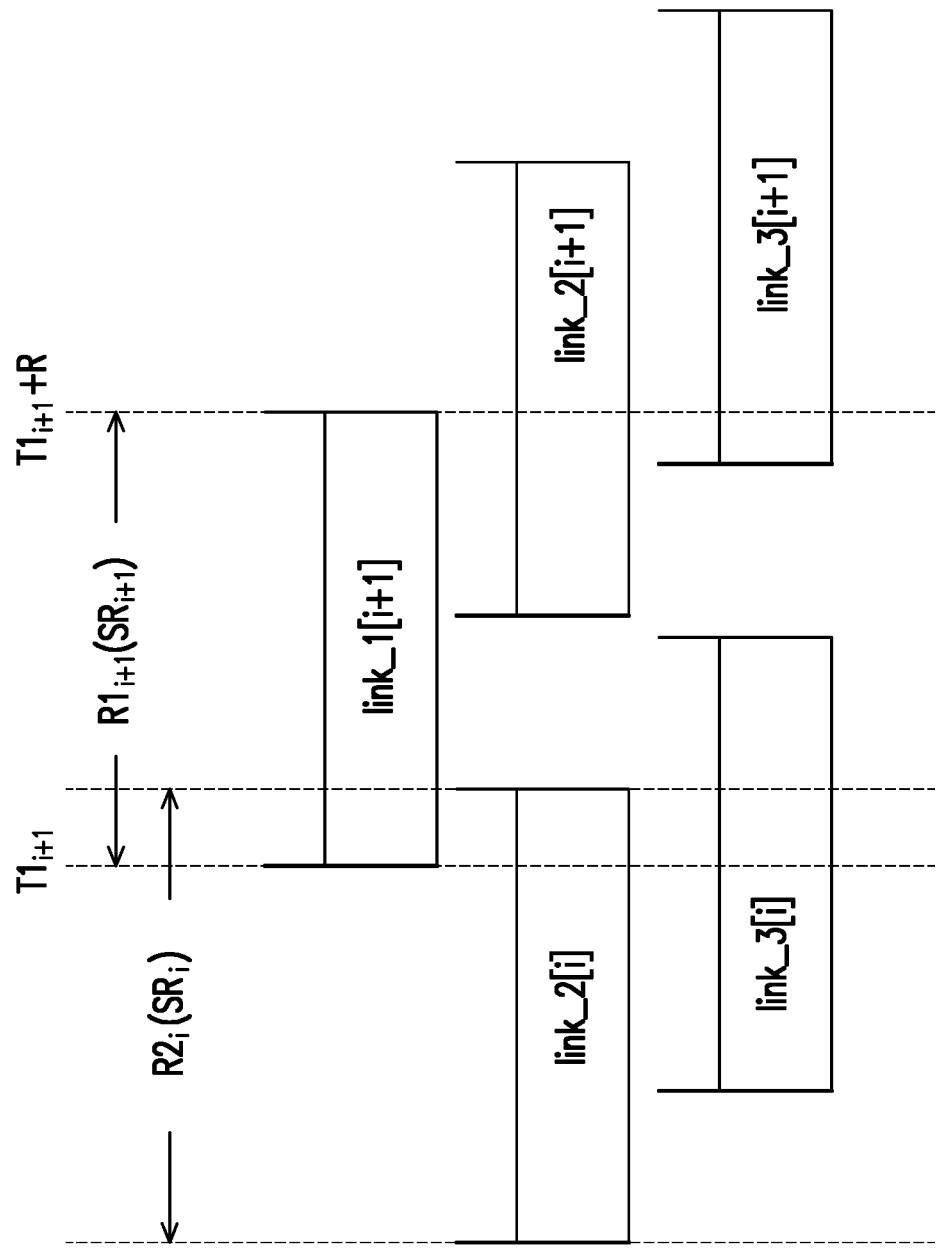
FIG. 6 is a diagram of another application scenario according to FIG. 5.

With reference to FIG. 6, FIG. 6 is a diagram of another application scenario according to FIG. 5. In FIG. 6, it is assumed that the considered value of m is i+1, but is not limited thereto. In this case, after the receiving circuit 312 receives any one of the data sections link_1[$i$+1] to link_3 [$i$+1], the processing circuit 314 may determine whether any one of the receiving time points of the data sections link_1 [$i$+1] to link_3[$i$+1] is within the designated delay range $SR_i$ corresponding to the i-th data frame.

In the scenario of FIG. 6, assuming that the receiving time point (i.e., $T1_{i+1}$) of the data section link_1[$i$+1] is within the designated delay range $SR_i$, then the processing circuit 314 may ignore the data sections link_1[$i$] to link_3[$i$] of the i-th data frame, and may not restore the i-th data frame. In addition, the processing circuit 314 may also generate an alarm corresponding to the i-th data frame, so as to record that the i-th data frame is not successfully recombined and restored.

In brief, if a receiving time point of a data section of a following data frame falls into a designated delay range corresponding to a previous data frame, the processing circuit 314 may accordingly ignore data sections of the previous data frame and generate an alarm. Nonetheless, the disclosure is not limited thereto.

In other embodiments, in response to determining that the receiving time point of the n-th data section of the m-th data frame is not within the designated delay range $SR_i$ corresponding to the i-th data frame, the processing circuit 314 may determine a reference delay range of the n-th data section of the m-th data frame according to the preset delay time (i.e., R) and the receiving time point of the n-th data section of the m-th data frame.

After that, in response to determining that the n-th data section of the m-th data frame is first received among the N number of data sections of the m-th data frame, the processing circuit 314 takes the reference delay range of the n-th data section of the m-th data frame as a designated delay range corresponding to the m-th data frame. Then, in response to determining that receiving time points of the data sections of the m-th data frame are each within the designated delay range corresponding to the m-th data frame, the processing circuit 314 restores the m-th data frame based on the N number of data sections of the m-th data frame.

In addition, in response to determining that the receiving time points of the data sections of the m-th data frame are not each within the designated delay range corresponding to the m-th data frame, the processing circuit 314 may ignore the N number of data sections of the m-th data frame. Nonetheless, the disclosure is not limited thereto. Reference may be made to the description in the above embodiments for the relevant details, which will not be repeatedly described herein.

Figure 7:
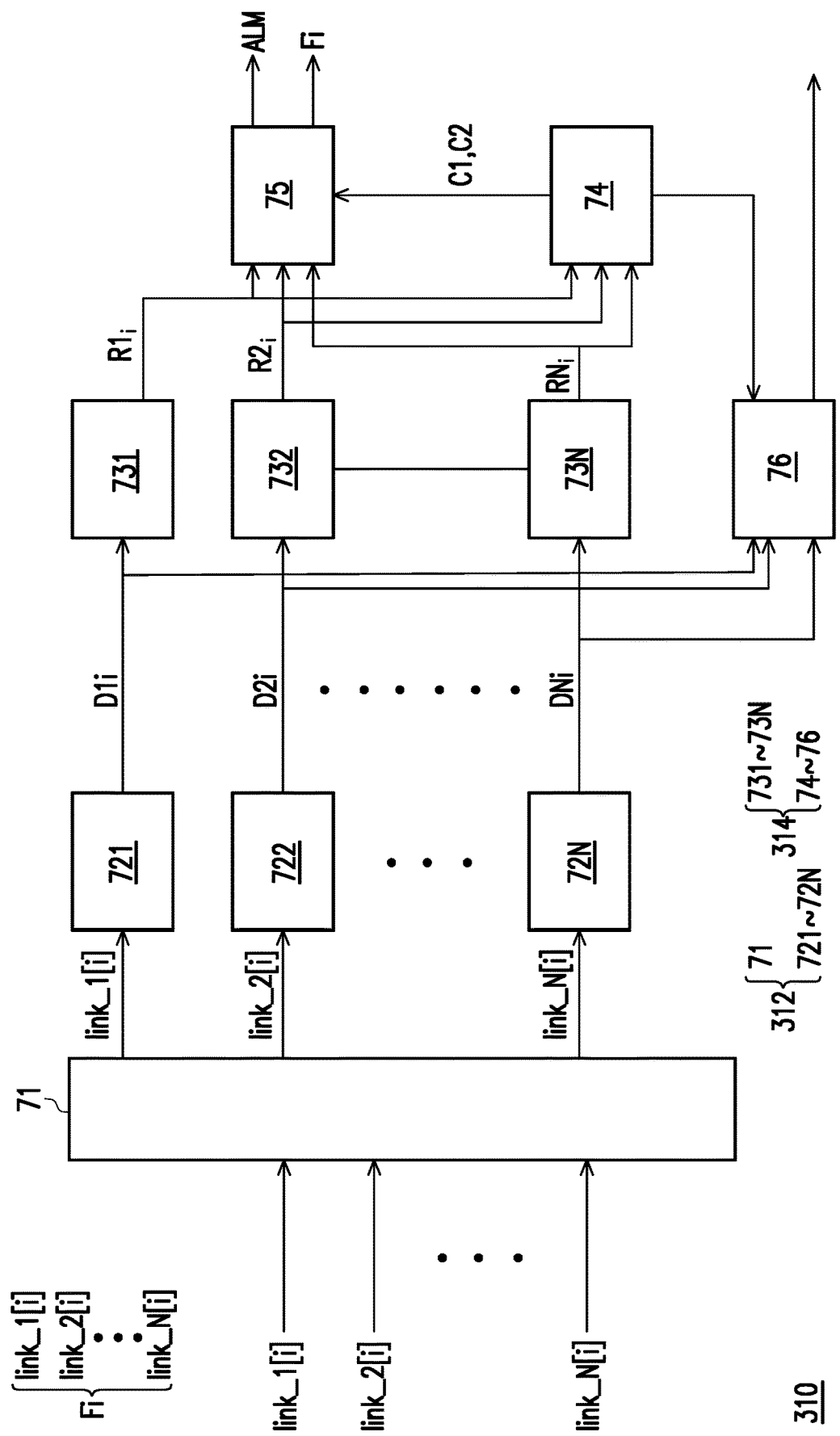
FIG. 7 is a schematic diagram of a multi-link receiver according to an embodiment of the disclosure.

With reference to FIG. 7, FIG. 7 is a schematic diagram of a multi-link receiver according to an embodiment of the disclosure. In FIG. 7, the receiving circuit 312 of the multi-link receiver 310 may include a receiving interface 71 and an N number of indicator generators 721 to 72N. The processing circuit 314 may include an N number of first range determination circuits 731 to 73N, a determining circuit 76, a second range determination circuit 74, and a restoring circuit 75.

In FIG. 7, the indicator generators 721 to 72N respectively correspond to the N number of data sections link_1[$i$] to link_N[i] of the i-th data frame Fi. In an embodiment, the receiving interface 71 is coupled to the indicator generators 721 to 72N, and after receiving the j-th data section belonging to the i-th data frame Fi from the multi-link transmitter 101, triggers a j-th indicator generator among the indicator generators 721 to 72N to generate an indicator. A time when the j-th indicator generator generates the indicator corresponds to the receiving time point of the j-th data section of the i-th data frame Fi.

For example, when the receiving interface 71 receives the data section link_1[$i$] (i.e., the first data section of the i-th data frame Fi) from the multi-link transmitter 101, the receiving interface 71 may trigger the indicator generator 721 (i.e., the first indicator generator among the indicator generators 721 to 72N) to generate an indicator D1$i$. A generation time of the indicator D1$i$ may correspond to the receiving time point of the data section link_1[$i$]. In addition, when the receiving interface 71 receives the data section link_2[$i$] (i.e., the second data section of the i-th data frame Fi) from the multi-link transmitter 101, the receiving interface 71 may trigger the indicator generator 722 (i.e., the second indicator generator among the indicator generators 721 to 72N) to generate an indicator D2$i$. A generation time of the indicator D2$i$ may correspond to the receiving time point (e.g., T2$_i$ in FIG. 5) of the data section link_2[$i$]. Furthermore, when the receiving interface 71 receives the data section link_N[i] (i.e., the N-th data section of the i-th data frame Fi) from the multi-link transmitter 101, the receiving interface 71 may trigger the indicator generator 72N (i.e., the N-th indicator generator among the indicator generators 721 to 72N) to generate an indicator DNi. A generation time of the indicator DNi may correspond to the receiving time point of the data section link_N[i].

In FIG. 7, the first range determination circuits 731 to 73N are respectively coupled to the indicator generators 721 to 72N. In an embodiment, in response to the indicator of the j-th indicator generator, a j-th range determination circuit among the first range determination circuits 731 to 73N determines the reference delay range of the j-th data section of the i-th data frame Fi according to the preset delay time (i.e., R) and the receiving time point of the j-th data section of the i-th data frame Fi.

For example, in response to the indicator D1$i$ of the indicator generator 721, the first range determination circuit 731 may determine the reference delay range R1$_i$ of the data section link_1[$i$] according to the preset delay time (i.e., R) and the receiving time point of the data section link_1[$i$] of the i-th data frame Fi. In addition, in response to the indicator D2$i$ of the indicator generator 722, the first range determination circuit 732 may determine the reference delay range (e.g., the reference delay range R2$_i$ of FIG. 5) of the data section link_1[$i$] according to the preset delay time (i.e., R) and the receiving time point (e.g., T2$_i$ in FIG. 5) of the data section link_2[$i$] of the i-th data frame Fi. Furthermore, in response to the indicator DNi of the indicator generator 72N, the first range determination circuit 73N may determine a reference delay range RN$_i$ of the data section link_N [i] according to the preset delay time (i.e., R) and the receiving time point of the data section link_N[i] of the i-th data frame Fi.

In an embodiment, the determining circuit 76 is coupled to the indicator generators 721 to 72N, and may find out the earliest generated indicator (which corresponds to the earliest received data section) based on the generation time points of the indicators D1$i$ to DNi (i.e., the receiving time points of the data sections link_1[$i$] to link_N[i]).

In an embodiment, in response to determining that the j-th indicator generator generates the indicator before the other indicator generators, the determining circuit 76 may determine that the j-th data section of the i-th data frame Fi is first received among the N number of data sections link_1[$i$] to link_N[i] of the i-th data frame Fi.

For example, assuming that the determining circuit 76 determines that the indicator generator 721 generates the indicator D1$i$ before the other indicator generators, then the determining circuit 76 may accordingly determine that the data section link_1[$i$] is first received by the multi-link receiver 310 among the data sections link_1[$i$] to link_N[i] (i.e., the data section link_1[$i$] is received earliest by the multi-link receiver 310 among the data sections link_1[$i$] to link_N[i]). For another example, assuming that the determining circuit 76 determines that the indicator generator 722 generates the indicator D2$i$ before the other indicator generators, then the determining circuit 76 may accordingly determine that the data section link_2[$i$] is first received by the multi-link receiver 310 among the data sections link_1[$i$] to link_N[i] (i.e., the data section link_2[$i$] is received earliest by the multi-link receiver 310 among the data sections link_1[$i$] to link_N[i]). In addition, assuming that the determining circuit 76 determines that the indicator generator 72N generates the indicator DNi before the other indicator generators, then the determining circuit 76 may accordingly determine that the data section link_N[i] is first received by the multi-link receiver 310 among the data sections link_1[$i$] to link_N[i] (i.e., the data section link_N [i] is received earliest by the multi-link receiver 310 among the data sections link_1[$i$] to link_N[i]).

In an embodiment, the second range determination circuit 74 is coupled to the indicator generators 721 to 72N, and after the determining circuit 76 determines that the j-th data section of the i-th data frame Fi is first received among the N number of data sections link_1[$i$] to link-N[i] of the i-th data frame Fi, takes the reference delay range of the j-th data section as the designated delay range corresponding to the i-th data frame Fi.

Taking FIG. 5 as an example, since the data section link_2[$i$] is determined to be first received by the multi-link receiver 310 among the data sections link_1[$i$] to link_N[i], the second range determination circuit 74 may use the reference delay range R2$_i$ of the data section link_2[$i$] as the designated delay range SR$_i$ corresponding to the i-th data frame Fi.

After that, the second range determination circuit 74 may determine whether the receiving time points of the data sections link_1[$i$] to link_N[i] of the i-th data frame Fi are each within the designated delay range SR$_i$ corresponding to the i-th data frame Fi. If so, the second range determination circuit 74 may provide a first command C1 to the restoring circuit 75, and in the opposite case, the second range determination circuit 74 may provide a second command C2 to the restoring circuit 75.

In an embodiment, the restoring circuit 75 is coupled to the second range determination circuit 74 and the indicator generators 721 to 72N, and in response to the first command C1, restores the i-th data frame Fi based on the data sections link_1[$i$] to link_N[i] of the i-th data frame Fi. In addition, if the restoring circuit 75 receives the second command C2 from the second range determination circuit 74, in response to the second command C2, the restoring circuit 75 may ignore the data sections link_1[$i$] to link_N[i] of the i-th data frame Fi and may provide a corresponding alarm ALM. Nonetheless, the disclosure is not limited thereto.

In the embodiments of the disclosure, reference may be made to the description in the above embodiments for the details of the operations performed by the first range determination circuits 731 to 73N, the determining circuit 76, the second range determination circuit 74, and the restoring circuit 75, which will not be repeatedly described herein.

In summary of foregoing, in the embodiments of the disclosure, after the multiple data sections belonging to the same data frame are received through multi-link transmission, the designed delay range corresponding to the data frame may be determined using the earliest received one of the data sections. After that, in the embodiments of the disclosure, when it is determined that the data sections belonging to the same data frame are received within the designated delay range, the data sections may be accordingly recombined to restore the data frame. In addition, in the embodiments of the disclosure, if the data sections belonging to the same data frame are not received within the designated delay range, the data sections may be ignored and a corresponding alarm may be provided accordingly. According to the above, the embodiments of the disclosure provide a DDCM mechanism that has a simple architecture and is easy to perform, which can easily achieve management of the differential delay in a multi-link transmission mechanism.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A multi-link receiving method, adapted for a multi-link receiver, the method comprising:
   in response to determining that a j-th data section belonging to an i-th data frame is received, determining a reference delay range of the j-th data section of the i-th data frame according to a preset delay time and a receiving time point of the j-th data section of the i-th data frame, wherein the i-th data frame comprises an N number of data sections, where $1 \leq j \leq N$, i is an index value, and N is a positive integer larger than 1;
   in response to determining that the j-th data section of the i-th data frame is first received among the N number of data sections of the i-th data frame, taking the reference delay range of the j-th data section of the i-th data frame as a designated delay range corresponding to the i-th data frame;
   in response to determining that receiving time points of the data sections of the i-th data frame are each within the designated delay range corresponding to the i-th data frame, restoring the i-th data frame based on the N number of data sections of the i-th data frame;
   receiving an n-th data section belonging to an m-th data frame, wherein the m-th data frame comprises an N number of data sections, where $1 \leq n \leq N$, m is an index value, and m is greater than i; and
   in response to determining that a receiving time point of the n-th data section of the m-th data frame is within the designated delay range corresponding to the i-th data frame, ignoring the N number of data sections of the i-th data frame.

2. The method as described in claim 1, further comprising:
   in response to determining that the receiving time points of the N number of data sections of the i-th data frame are not each within the designated delay range corresponding to the i-th data frame, ignoring the N number of data sections of the i-th data frame.

3. The method as described in claim 1, further comprising:
   in response to determining that the receiving time point of the n-th data section of the m-th data frame is not within the designated delay range corresponding to the i-th data frame, determining a reference delay range of the n-th data section of the m-th data frame according to the preset delay time and the receiving time point of the n-th data section of the m-th data frame;
   in response to determining that the n-th data section of the m-th data frame is first received among the N number of data sections of the m-th data frame, taking the reference delay range of the n-th data section of the m-th data frame as a designated delay range corresponding to the m-th data frame; and
   in response to determining that receiving time points of the data sections of the m-th data frame are each within the designated delay range corresponding to the m-th data frame, restoring the m-th data frame based on the N number of data sections of the m-th data frame.

4. A multi-link receiver, comprising:
   a receiving circuit, receiving a j-th data section belonging to an i-th data frame;
   a processing circuit, coupled to the receiving circuit, and being configured to:
      determine a reference delay range of the j-th data section of the i-th data frame according to a preset delay time and a receiving time point of the j-th data section of the i-th data frame, wherein the i-th data frame comprises an N number of data sections, where $1 \leq j \leq N$, i is an index value, and N is a positive integer larger than 1;
      in response to determining that the j-th data section of the i-th data frame is first received among the N number of data sections of the i-th data frame, take the reference delay range of the j-th data section of the i-th data frame as a designated delay range corresponding to the i-th data frame; and
      in response to determining that receiving time points of the data sections of the i-th data frame are each within the designated delay range corresponding to the i-th data frame, restore the i-th data frame based on the N number of data sections of the i-th data frame;

wherein the receiving circuit receives an n-th data section belonging to an m-th data frame, wherein the m-th data frame comprises an N number of data sections, where 1≤n≤N, m is an index value, and m is greater than i; and in response to determining that a receiving time point of the n-th data section of the m-th data frame is within the designated delay range corresponding to the i-th data frame, the processing circuit ignores the N number of data sections of the i-th data frame.

5. The multi-link receiver as described in claim 4, wherein the receiving circuit comprises:

an N number of indicator generators, wherein the N number of indicator generators respectively correspond to the N number of data sections of the i-th data frame;

a receiving interface, coupled to the N number of indicator generators, and after receiving the j-th data section belonging to the i-th data frame from a multi-link transmitter, trigger a j-th indicator generator among the N number of indicator generators to generate an indicator, wherein a time when the j-th indicator generator generates the indicator corresponds to the receiving time point of the j-th data section of the i-th data frame.

6. The multi-link receiver as described in claim 5, wherein the processing circuit comprises:

an N number of first range determination circuits, respectively coupled to the N number of indicator generators, wherein in response to the indicator of the j-th indicator generator, a j-th range determination circuit among the N number of first range determination circuits determines the reference delay range of the j-th data section of the i-th data frame according to the preset delay time and the receiving time point of the j-th data section of the i-th data frame.

7. The multi-link receiver as described in claim 5, wherein the processing circuit comprises:

a determining circuit, coupled to the N number of indicator generators, and being configured to:

in response to determining that the j-th indicator generator generates the indicator before the other indicator generators, determine that the j-th data section of the i-th data frame is first received among the N number of data sections of the i-th data frame.

8. The multi-link receiver as described in claim 5, wherein the processing circuit comprises:

a second range determination circuit, coupled to the N number of indicator generators, and being configured to:

take the reference delay range of the j-th data section of the i-th data frame as the designated delay range corresponding to the i-th data frame; and in response to determining that the receiving time points of the data sections of the i-th data frame are each within the designated delay range corresponding to the i-th data frame, provide a first command; and a restoring circuit, coupled to the second range determination circuit and the N number of indicator generators, and in response to the first command, restoring the i-th data frame based on the N number of data sections of the i-th data frame.

9. The multi-link receiver as described in claim 8, wherein in response to determining that the receiving time points of the N number of data sections of the i-th data frame are not each within the designated delay range corresponding to the i-th data frame, the second range determination circuit provides a second command to the restoring circuit; and in response to the second command, the restoring circuit ignores the N number of data sections of the i-th data frame.

10. The multi-link receiver as described in claim 4, wherein the processing circuit is further configured to:

in response to determining that the receiving time point of the n-th data section of the m-th data frame is not within the designated delay range corresponding to the i-th data frame, determine a reference delay range of the n-th data section of the m-th data frame according to the preset delay time and the receiving time point of the n-th data section of the m-th data frame;

in response to determining that the n-th data section of the m-th data frame is first received among the N number of data sections of the m-th data frame, take the reference delay range of the n-th data section of the m-th data frame as a designated delay range corresponding to the m-th data frame; and in response to determining that receiving time points of the data sections of the m-th data frame are each within the designated delay range corresponding to the m-th data frame, restore the m-th data frame based on the N number of data sections of the m-th data frame.

* * * * *